UNITED STATES PATENT OFFICE.

AUGUST BLANK AND WILHELM BERGDOLT, OF LEVERKUSEN, GERMANY, ASSIGNORS TO FARBENFABRIKEN VORM. FRIEDR. BAYER & CO., OF ELBERFELD, GERMANY, A CORPORATION OF GERMANY.

TRISAZO DYE 971,111. Specification of Letters Patent. Patented Sept. 27, 1910.

No Drawing. Application filed March 14, 1910. Serial No. 549,184.

*To all whom it may concern:*

Be it known that we, AUGUST BLANK and WILHELM BERGDOLT, citizens of the German Empire, residing at Leverkusen, Germany, have invented new and useful Improvements in New Azo Dyes, of which the following is a specification.

The present invention relates to the manufacture and production of new trisazo dyestuffs. The process for their production consists in combining the diazo compounds of monoacidyl-meta-diamins of the benzene series with aminonaphthol sulfonic acids, eliminating the acidyl radical from the products thus produced by saponification, tetrazotizing the resulting azo compounds and combining the tetrazoazo compounds thus produced with two molecules of the same or of different meta-diamins of the benzene series or of derivatives thereof. The new dyes thus produced are after being dried and pulverized dark powders soluble in water generally with a brown color. They have a strong coloring power and their brown shades are fast to acids and alkalies. They can be further combined with diazo compounds and this combination can also be carried out on the fiber. The shades are in this manner materially deepened and rendered fast to washing.

In order to illustrate the new process more fully the following example is given, the parts being by weight:—13.6 parts of formyl-meta-phenylenediamin are diazotized with nitrite and HCl. The diazo compound is then introduced into an alkaline solution which has been prepared by dissolving 24 parts of 2-amino-8-naphthol-6-sulfonic acid in an aqueous solution of 36 parts of sodium carbonate. After the combination is complete the product of the reaction is heated to boiling. The formyl group is then eliminated from the resulting dye by heating the mixture for ½ to 1 hour to boiling with caustic soda lye (containing 35 parts of NaOH). Subsequently the excess of alkali is neutralized with hydrochloric acid, and the diamin thus obtained is after cooling with ice tetrazotized with 50 parts of hydrochloric acid (20° Bé.) and 15 parts of nitrite. The mixture is stirred for 4 hours and the tetrazo compound is then added to a cooled solution of 24.4 parts of meta-toluylenediamin containing 30 parts of sodium carbonate. After about 1 hour the reaction is complete. The dye is filtered off and dried. It is after being dried and pulverized a dark powder soluble in water with a brown color; yielding upon reduction with stannous chlorid and hydrochloric acid meta-phenylenediamin, amino-meta-toluylenediamin and 2.7-diamino-8-naphthol-6-sulfonic acid. It dyes cotton brown shades fast to washing after being developed with diazotized para-nitranilin. Other meta-diamins of the benzene series, such as meta-phenylenediamin, or chloro-meta-phenylenediamin, meta-diaminophenylether, nitro-meta-phenylenediamin, alkylated meta-diamins, the condensation products of meta-diamins with chloroacetic acid or mixtures of these products may be used. Other acidylized meta-diamins may be used, e. g. acidylized meta-toluylenediamins, or other substitution products of meta-phenylenediamin, meta-toluylenediamino-oxaminic sulfonic acid, etc., and other aminonaphthol sulfonic acids, e. g. 1.8.3.6- or 2.1.5.7-aminonaphtholdisulfonic acid, 1.5.7- or 2.5.7-aminonaphthol sulfonic acid etc.

Mixed dyestuffs can be prepared on using two different molecules of meta-diamins as end components, e. g. one molecule of meta-phenylenediamin sulfonic acid and one molecule of meta-phenylenediamin, etc.

We claim:—

1. The herein described new trisazo dyestuffs which are after being dried and pulverized dark powders soluble in water generally with a brown color, dyeing cotton brown shades fast to washing after being developed with diazotized para-nitranilin, substantially as described.

2. The herein described new trisazo dyestuff obtainable from formyl metaphenylenediamin, 2-amino-8-naphthol-6-sulfonic acid and meta-toluylenediamin, which is after being dried and pulverized a dark powder soluble in water with a brown color, dyeing cotton brown shades fast to washing after being developed with diazotized paranitranilin, and yielding upon reduction with stannous chlorid and hydrochloric acid meta-phenylenediamin, amino-meta-toluylenediamin and 2.7-diamino-8-naphthol-6-sulfonic acid, substantially as described.

In testimony whereof we have hereunto set our hands in the presence of two subscribing witnesses.

AUGUST BLANK. [L. S.]
WILHELM BERGDOLT. [L. S.]

Witnesses:
OTTO KÖNIG,
CHAS. J. WRIGHT.